United States Patent
Sumser et al.

(10) Patent No.: US 7,073,334 B2
(45) Date of Patent: Jul. 11, 2006

(54) VARIABLE EXHAUST GAS TURBOCHARGER

(75) Inventors: Siegfried Sumser, Stuttgart (DE); Peter Fledersbacher, Stuttgart (DE); Wolfgang Erdmann, Stuttgart (DE); Manfred Stute, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 12 days.

(21) Appl. No.: 10/949,959

(22) Filed: Sep. 24, 2004

(65) Prior Publication Data

US 2005/0056016 A1    Mar. 17, 2005

Related U.S. Application Data

(63) Continuation-in-part of application No. PCT/EP03/00862, filed on Jan. 29, 2003.

(30) Foreign Application Priority Data

Mar. 28, 2002   (DE) .................... 102 13 897

(51) Int. Cl.
  F02D 23/00   (2006.01)
  F04D 29/44   (2006.01)
  F04D 1/08    (2006.01)
  F04D 1/10    (2006.01)
  F01D 1/06    (2006.01)

(52) U.S. Cl. .................. 60/602; 60/605.1; 415/163; 415/62; 415/87

(58) Field of Classification Search ............... 60/602, 60/605.1; 415/147, 163, 62, 87, 146, 149.1
See application file for complete search history.

(56) References Cited

U.S. PATENT DOCUMENTS

| 3,369,737 | A | * | 2/1968 | Switzer et al. ............ 415/87 |
| 3,460,748 | A | * | 8/1969 | Erwin ..................... 415/163 |
| 3,639,075 | A |   | 2/1972 | Erwin ..................... 415/163 |
| 4,484,857 | A |   | 11/1984 | Patin ..................... 415/146 |
| 6,012,897 | A | * | 1/2000 | Sabnis et al. ............. 415/62 |
| 6,634,174 | B1 | * | 10/2003 | Sumser et al. ............ 60/602 |
| 6,957,535 | B1 | * | 10/2005 | Sumser et al. ............ 60/607 |

FOREIGN PATENT DOCUMENTS

| DE | 199 55 508 C 1 |   | 4/2001 |
| DE | 100 07 669 A 1 |   | 8/2001 |
| WO | WO 2004009961 A1 | * | 1/2004 |

* cited by examiner

*Primary Examiner*—Thai-Ba Trieu
(74) *Attorney, Agent, or Firm*—Klaus J. Bach

(57) ABSTRACT

In a variable exhaust gas turbocharger for an internal combustion engine having an exhaust gas turbine and a compressor with a variable vane structure wherein the exhaust gas turbocharger comprises a housing and a compressor wheel which is connected to an exhaust gas turbine wheel via a shaft, the compressor has a radial inflow flow passage in which a variable vane structure or throttle device is arranged upstream of the compressor wheel and another vane structure is arranged in the radial flow passage downstream of the compressor wheel in the direction of flow.

7 Claims, 3 Drawing Sheets

Section A-A'

VARIABLE EXHAUST GAS TURBOCHARGER

This is a Continuation-In-Part Application of International Application PCT/EP03/00862 filed Jan. 29, 2003 and claiming the priority of German application 102 13 897.4 filed Mar. 28, 2002.

BACKGROUND OF THE INVENTION

The invention relates to a variable exhaust gas turbocharger for an internal combustion engine including an exhaust gas turbine and a compressor disposed within a housing. The compressor wheel is connected to an exhaust gas turbine wheel via a shaft. The compressor has a variable guide vane arrangement and/or throttle device.

A variable exhaust gas turbocharger is already known for example from DE 199 55 508 C1. An internal combustion engine with an exhaust gas turbocharger which comprises an exhaust gas turbine and a compressor for generating compressed charging air is described. In addition, the internal combustion engine has a turbine which is rotationally connected to the compressor and to which combustion air can be fed via an adjustable shutoff element. The turbine outlet is connected to the intake section downstream of the compressor via a connecting duct. The internal combustion engine has a closed-loop and open-loop control unit for generating control signals which adjust the shutoff element.

A supplementary duct which branches off from the intake section upstream of the compressor, to the air inlet of the turbine, is provided. The air supply into the supplementary duct and into the compressor inlet can be adjusted by means of the shutoff element. In the lower load range, an actuating signal, by means of which the shutoff element can be adjusted to a position which opens the supplementary duct and reduces the air supply to the compressor inlet can be generated in the closed-loop and open-loop control unit if the set-point charging pressure drops below a threshold value.

Variable exhaust gas turbocharger turbines are currently being used in relatively small internal combustion engines and in relatively large utility vehicle diesel engines which operate with a medium speed.

The possibilities of the use of variable inflow guide vanes as a swirl device upstream of the compressor wheel and of diffusers with variable vanes downstream of the compressor wheel on the widespread mixed flow compressors have been known for a long time. The mixed flow compressors have an axial flow at the inlet and a radial flow at the outlet. Hitherto, variable inflow guide vanes have been used in relatively small numbers, which is due in particular to the complicated and expensive design of the axial inflow guide vane structures.

It is the object of the present invention to provide an exhaust gas turbocharger in such a way that the guidance of the flow is improved and the efficiency of the exhaust gas turbocharger increased by means of guide devices which are installed in to the flow passage.

SUMMARY OF THE INVENTION

In a variable exhaust gas turbocharger for an internal combustion engine having an exhaust gas turbine and a compressor with a variable vane structure wherein the exhaust gas turbocharger comprises a housing and a compressor wheel which is connected to an exhaust gas turbine wheel via a shaft, the compressor has a radial flow passage inflow in which variable vane structure or throttle device is arranged upstream of the compressor wheel and another vane structure is arranged in the radial flow passage downstream of the compressor wheel in the direction of flow.

For this purpose, both a guide vane structure and a throttle device are provided within the radial annular duct upstream of the compressor wheel blades in the direction of flow and a guide vane structure and/or throttle device are provided downstream of the compressor wheel blades in the direction of flow. The adjustable swirl device and/or throttle device upstream of the compressor wheel blades is embodied as a radial inflow guide vane structure and the adjustable swirl device and/or throttle device downstream of the compressor wheel vanes is embodied as a radial diffuser vane structure.

As a result it is ensured that the range of the compressor characteristic diagram can be extended in the direction of the pumping limit and stopping limit, which is important in particular for supercharged spark ignition engines.

The variable compressor geometry according to the invention makes it further possible, that the same pressure can be generated to take place at different rotational speeds of the exhaust gas turbocharger by an appropriate adjustment of a radial inflow guide vane structure of the compressor wheel.

The function of the variable inflow guide vane structure is of particular interest for the spark ignition engine if it also fulfills the function of a throttle valve. At low loads, the inflow guide vane structure will be able to place the compressor in what is referred to as the "turbine operating mode" by means of an extreme swirl position with swirl in the same direction as the flow, as a result of which the only power consumer is the bearing of the exhaust gas turbocharger, so that, as a result, very high exhaust gas turbocharger rotational speeds can be set at low loads. As a result, the concept of the steady-state turbocharger can be implemented in wide ranges of the characteristic diagram of the engine which is distinguished by the fact that there is virtually no "turbo-hole" and the desired air supply for building up torque of the engine is made available instantly when the throttle is opened.

According to one development, one possibility is for all the inflow guide vanes, or individual inflow guide vanes, of the radial inflow guide vane structure to be rotatable through ±90° about their pivot axis. As a result, they can optionally be rotated into a position with swirl in the direction of flow, a position with swirl in the opposite direction of the direction of flow or into an open position. The open position is at approximately 0°. They can be secured in any of these positions. The radial inflow guide vane structure can perform the function of a throttle valve and thus reduces any desired mass flow rate, which flows into the inflow duct of the compressor, to the idling point.

The rotational speed of the exhaust gas turbocharger can be reduced and the wheel diameter of the compressor wheels can be increased by the inventive method of controlling and increasing the degrees of supercharging. As a result, in contrast to long-established practice, the known mix flow wheel can advantageously be replaced by a pure radial wheel. With respect to the installation space it is possible to arrange the variable radial inflow guide vane structure with small functional gaps of the compressor wheel vanes in the pure inflow to the compressor wheel with parallel walls.

The adjustment mechanism is then greatly improved in structural and also cost terms, as a result of which the series development of the entire compressor is thus notably simplified.

In contrast to compressors without variable guide vane structure, the compressor with a variable can also be weighted in terms of power consumption if the inflow guide vane structure is set to swirl in the opposite direction from the direction of flow. As a result, the risk of an excessive rotational speed, such as occurs in the engine braking mode at high engine speeds at the utility vehicle with exhaust gas turbochargers with high levels of efficiency, can be eliminated.

In addition it is advantageous for the profiled contour of the inflow guide vane to be embodied with simple two-dimensional geometry. The inflow guide vane has a constant cross section in the axial direction of the compressor wheel. The vertical position of the inflow guide vane is constant in the radial direction of the compressor wheel.

The profiled contour of the compressor wheel vane can also be in the form of a simple two-dimensional geometrical line. In contrast to the vertical position of the inflow guide vane, the vertical position of the compressor vane is generally not constant in the radial direction of the compressor wheel. The vertical position of the compressor vane preferably decreases as the radius increases.

With this simple configuration of the wheel there is the possibility of the compressor wheel vanes having a common cover ring on their external contour, covering them off from the base body of the compressor wheel. As a result, a duct is formed between every two compressor wheel vanes in the radial direction. The cover ring is sealed off from the housing, for example by means of a labyrinth seal, in order to ensure the smallest possible leakages. Furthermore, the cover ring serves to provide stabilization in view of the tendency of the wheel vanes to oscillate.

According to one preferred embodiment of the solution according to the invention, a radial diffuser vane structure with diffuser vanes is arranged in the housing downstream of the compressor wheel in the direction of flow. In a simple embodiment the diffuser vanes are embodied with nonadjustable fixed geometry. In a preferred embodiment of an exhaust gas turbocharger according to the invention there is provision for the diffuser vanes also to be embodied so as to be adjustable and securable.

According to one further preferred embodiment of the solution according to the invention there is provision for the exhaust gas turbine to have a nonadjustable or adjustable turbine guide vane structure upstream of the exhaust gas turbine wheel. The individual vanes of the turbine guide vane structure can be adjusted in accordance with the inflow guide vanes. Finally, with an adjustable turbine guide vane structure the entire exhaust gas turbocharger can be controlled in a fully dynamic fashion.

In contrast to the embodiment and arrangement according to the invention it is advantageous that the variable exhaust gas turbocharger is fitted in a closed-loop and open-loop control system of an internal combustion engine which has a closed-loop and open-loop control unit. The closed-loop and open-loop control unit receives actual value signals from the internal combustion engine and from a plurality of pressure sensors in the closed-loop and open-loop control system. In addition, the closed-loop and open-loop control unit transmits control signals to control devices which are provided. These may be, for example, a component of the turbine guide vane structure, of the exhaust gas recirculation valve, of the radial diffuser vane structure or of the radial inflow guide vane structure of the compressor.

The device according to the invention makes possible, for example, a plurality of methods for controlling the rotational speed of a variable exhaust gas turbocharger. The variable exhaust gas turbocharger is a component of an internal combustion engine with transmission. In a first method, during a switching phase a controllable swirl in the opposite direction from the direction of flow is generated against the compressor wheel, as a result of which the exhaust gas turbocharger is braked in order to avoid pumping surges.

In a second method, during an engine braking phase by means of a radial inflow guide vane structure the compressor power consumption is increased by throttling, as a result of which the rotational speed of the exhaust gas turbocharger is limited in a controllable fashion.

In a third method, during a steady-state phase, a controllable swirl in the direction of flow with a pressure reduction over the entire compressor is generated against the compressor wheel, as a result of which the compressor operates as a turbine, which brings about high rotor speeds.

In addition it is advantageous that for the methods mentioned above, the rotational speed of the variable exhaust gas turbocharger is controlled as a function of a charging pressure, a load and an engine speed of the internal combustion engine, by means of a variable radial diffuser vane structure, which is connected downstream of the compressor wheel in the direction of flow, and a variable guide vane structure of the turbine.

Further advantages and details of the invention are explained in the patent claims and in the description and illustrated in the figures.

DESCRIPTION OF PREFERRED EMBODIMENTS

Figure 1:
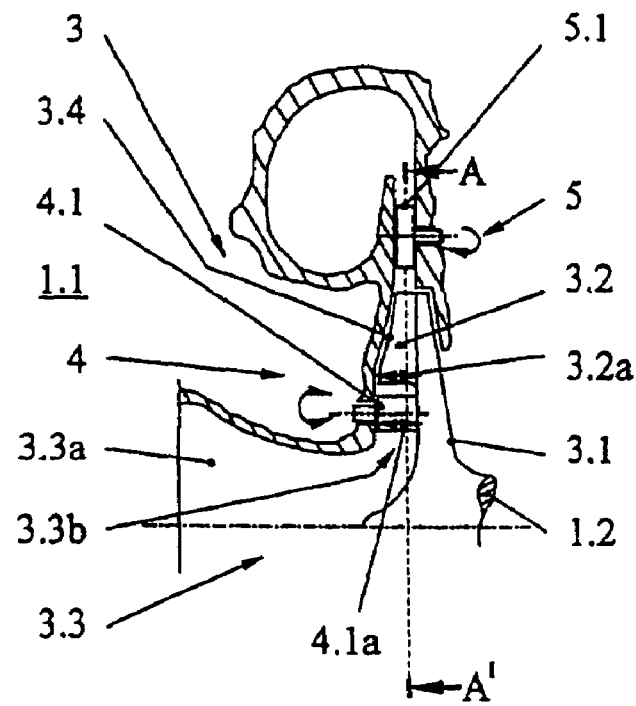
FIG. 1 shows a section through a compressor.
Figure 2:
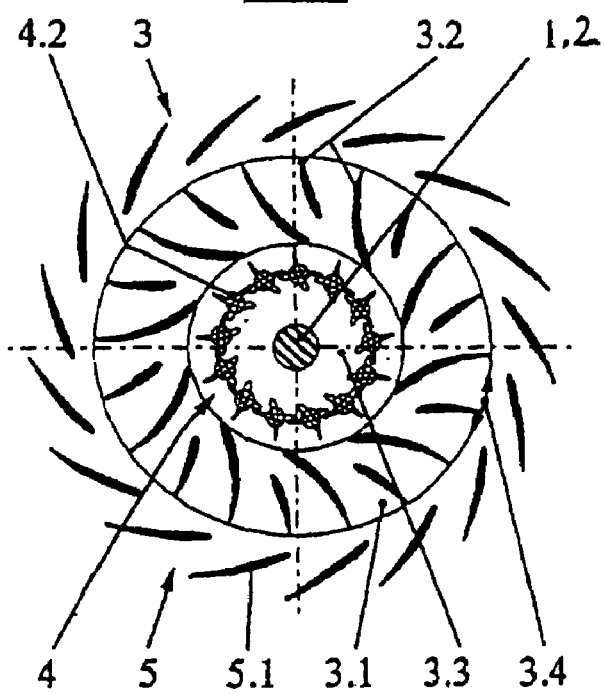
FIG. 2 shows a sectional view taken along line A–A' of FIG. 1 over the entire flow area of the compressor.

FIGS. 1 and 2 show the basic design of a simple variable radial compressor 3 which has, in a radial inflow 3.3b, a radially orientated variable inflow guide vane structure 4 arranged directly upstream of a compressor wheel blades 3.2. In FIG. 2, the entire radial flow cross section of the compressor 3 is illustrated along a section A–A' according to FIG. 1.

The inflow into an inflow duct 3.3 to the radial inflow guide vane structure 4 is provided by an open axial duct 3.3a which leads to the subsequent radial inflow 3.3b in which the radial inflow guide vane structure 4 is provided.

The respective radial inflow guide vane structure 4 is illustrated in FIG. 2 in two different positions 4.2: one extreme position with swirl in the direction of flow, in which position the radial inflow guide vane structure 4 almost entirely closes the radial passage 3.3b, and the virtually completely open position. If the vane structure were to be turned further out of the position with swirl in the direction of flow via the open position, a position with swirl in the direction opposite to the direction of flow would be generated. In the position with swirl in the direction opposite to the direction of flow, the diversion of the flow of a compressor wheel 3.1 is increased further and the aerodynamic loading and a greater pressure is generated by the compressor wheel 3.1. The adjustment angle range of the inflow guide vanes 4.1 is from approximately −90° to +90° depending on the thickness of the inflow guide vanes 4.1. This adjustment angle range advantageously provides for a wide variability, from the almost closed position with swirl in the direction of flow in the engine idling mode in spark ignition engines up to the largest possible aerodynamic loading of the compressor wheel 3.1 in utility vehicle diesel engines in the engine braking mode. This adjustment range can be easily implemented by the constant radial position 4.1a of the inflow guide vane.

A large cost advantage of the concept is the possibility of a two-dimensional configuration of the radial inflow guide vanes 4.1 and also of the compressor wheel blades 3.2. The compressor wheel blades 3.2 of the compressor wheel 3.1 are easily adapted to the throughflow requirements by means of their contour in the of the compressor vanes in their radial position 3.2a.

In order to provide stabilization in view of the tendency of the compressor wheel blade 3.2 to vibrate outer circumference of the compressor wheel blades 3.2 may be stabilized by a connecting ring (not illustrated). By means of the connecting ring it is possible to provide, with respect to a housing 1.1, sealing means (not illustrated), such as labyrinth seals, which keep the leakages small.

The compressor wheel 3.1 is attached to an end of a shaft 1.2 as a boreless compressor wheel 3.1 in accordance with FIG. 1, which has the advantage of a favorable initial condition with respect to the rigidity loading.

In addition to the radial inflow guide vane structure 4 according to the invention, a diffuser with variable vanes, or a variable diffuser 5, which has rotatable diffuser vanes 5.1 and with which the behavior of the compressor 3 can also be influenced even more positively with respect to the pumping and stopping limit situation, is provided directly downstream of the compressor wheel blades 3.2.

In a simplified embodiment, the compressor 3 is designed only with an adjustable element, i.e. the diffuser 5 which has vanes or is without vanes and which is arranged downstream of the compressor wheel 3.1 has a nonadjustable fixed geometry when a variable inflow guide vane structure 4 is present.

Figure 3:
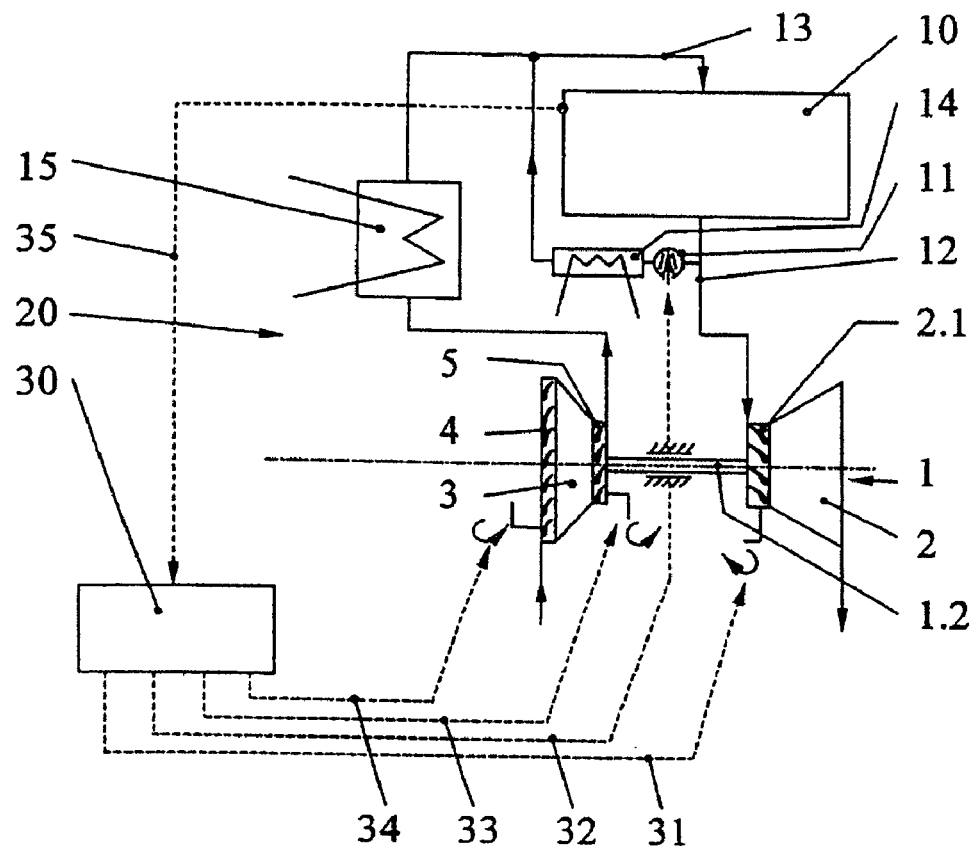
FIG. 3 shows a schematic arrangement of a closed-loop and open-loop control system for controlling an internal combustion engine.

The integration of the variable compressor geometry into a closed-loop and open-loop control system 20 of an internal combustion engine 10 is shown in FIG. 3. The closed-loop and open-loop control unit 30 receives actual value signals 35 from the internal combustion engine 10 and passes on control signals 33, 34 to an exhaust gas turbocharger 1 or to the variable inflow guide vane structure 4 and to the variable diffuser 5.

The variable compressor 3 is paired with an exhaust gas turbine 2 with a variable turbine guide vane structure 2.1 and in which the position of the turbine guide vane structure 2.1 is also dependent on a control signal 31.

The charge change state variables which are also determined by the behavior of the exhaust gas turbocharger 1 require an exhaust gas recirculation valve 11 to be monitored in the exhaust gas recirculation mode. The exhaust gas recirculation valve 11 is also supplied with control signals 32 by the closed-loop and open-loop control unit 30. The pressures at a point I 12 and at a point II 13 of the internal combustion engine 10 are of particular interest as charge change state variables.

In the arrangement shown, the exhaust gas recirculation valve 11 is located upstream of an exhaust gas recirculation cooler 14. The exhaust gas is admixed to the intake air of the internal combustion engine 10 so that the combustion or intake air is not polluted upstream of a charge air cooler 15.

Figure 4:
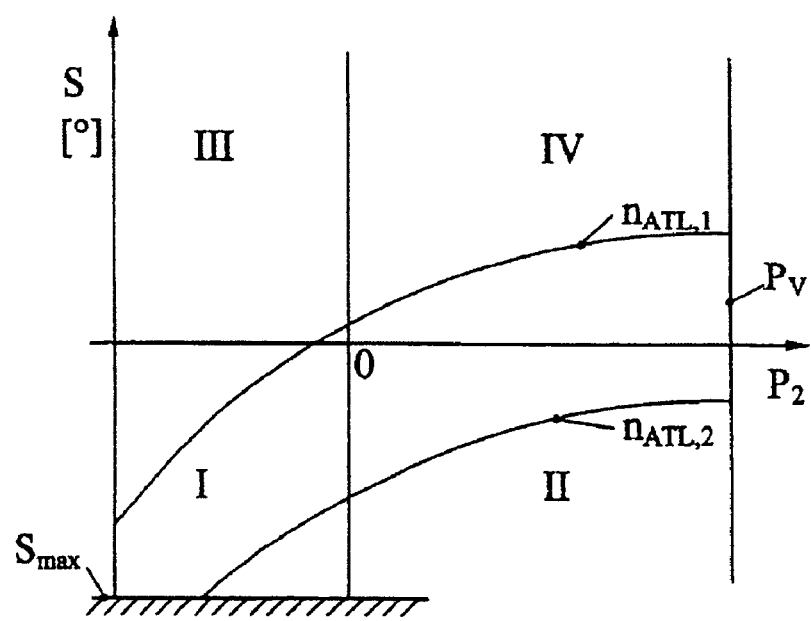
FIG. 4 is a diagram of the position S of a variable vane structure degrees [°] as a function of the charging pressure $P_2$.

FIG. 4 shows a basic diagram on which a charging pressure $P_2$ forms the abscissa and a swirl state S, which is generated by the radial inflow guide vane structure 4 of the compressor 3, is plotted on the ordinate. The swirl-free state and flow against the compressor wheel 3.1 divides the regions I and II with swirl in the direction of flow from the regions III and IV with swirl in the direction opposite to the direction of flow.

In a spark ignition engine, in particular the region I, in which the inflow guide vane structure 4 performs the function of a throttle valve and brings about the underpressure with a high flow rate with swirl in the direction of flow, is of interest. Here, the concept of what is referred to as "steady-state turbocharger" can be supported in a decisive fashion by avoiding the losses at the throttle valve and advantageously using them here for providing energy in the compressor 3 as drive energy. In this field the compressor 3 operates virtually as a turbine in order to keep an exhaust gas turbocharger rotational speed $n_{ATL,2}$ as high as possible.

The inflow guide vane structure 4 is closed in the idling mode of the internal combustion engine 10 up to a desired minimum cross section $S_{max}$.

In the upper load range of the spark ignition engine, the field II is active, in which field the intensity of the swirl in the direction of flow depends on the charging pressure $p_2$ and on an exhaust gas turbocharger rotational speed $n_{ATL}$. The higher the exhaust gas turbocharger rotational speed $n_{ATL}$ is intended to be, the greater the increase in the intensity of the swirl in the direction of flow for a given set-point charging pressure.

The ranges III and IV with swirl in the direction opposite to the direction of flow are less useful on a spark ignition engine in a low engine speed range $n_M$ since here the pumping limit is displaced in the direction of higher throughput rates and there tends to be a risk of pumping. In principle, these regions can however also be used for rapid braking of the exhaust gas turbocharger 1 at the compressor 3 in order to avoid the risk of pumping in the switching phase if the engine speeds $n_M$ drop very quickly.

The region IV has greater significance for the engine braking in the case of utility vehicle diesel engines with maximum turbo braking powers. As a result of an operating mode with swirl in the direction opposite to the direction of flow, the exhaust gas turbocharger rotational speed $n_{ATL}$ can be forced under a strength limiting rotational speed $n_{ATL,1}$ of the compressor and turbine wheels without having to accept a loss of braking power.

In the direction of a relatively high charging pressure $P_2$, the fields II and IV are limited by a full load $P_v$.

Figure 5:
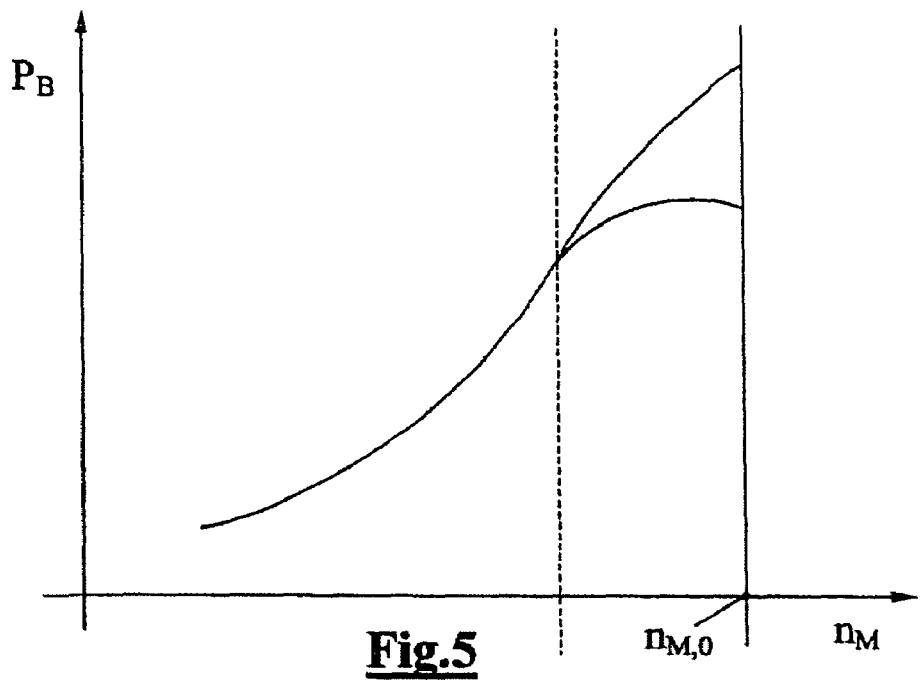
FIG. 5 is a diagram of the engine braking power $P_B$ as a function of the engine speed $n_M$.
Figure 6:
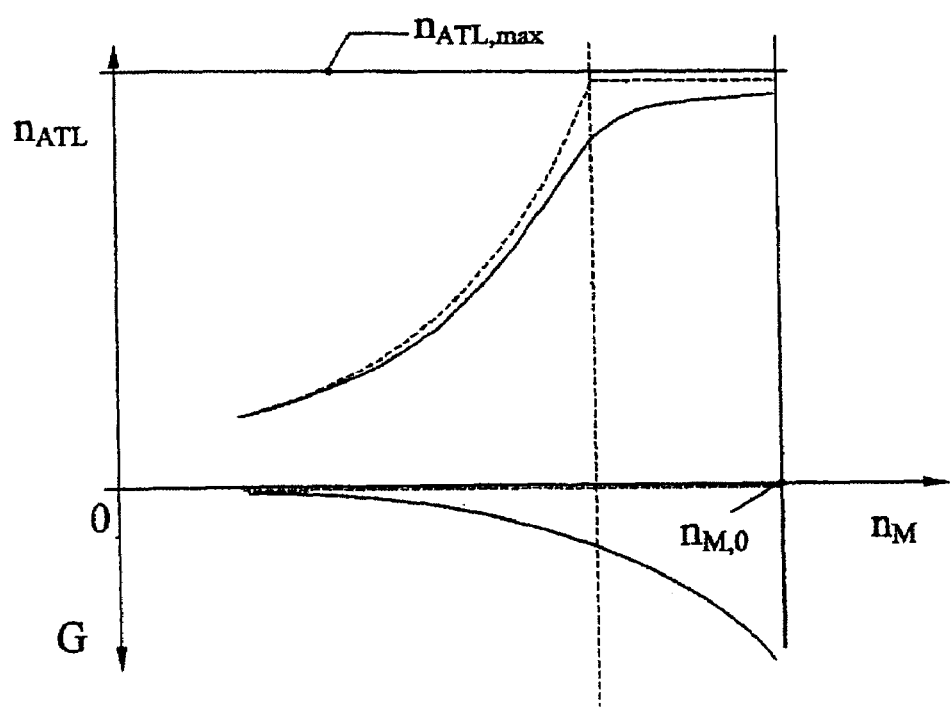
FIG. 6 is a diagram of the rotational speed $n_{ATL}$ of an exhaust gas turbocharger and of the swirl G in the opposite direction from the direction of flow as a function of the engine speed $n_M$.

In FIGS. 5 and 6 this is clarified by three parameters which are represented as a function of the engine speed $n_M$. The dashed lines each represent a swirl-free state and the continuous line represents a state with swirl of the compressor in the direction opposite to from the direction of flow.

FIG. 5 illustrates an engine braking power $P_B$ plotted against the engine speed $n_M$. FIG. 6 illustrates the rotational speed of the exhaust gas turbocharger $n_{ATL}$ at the top, and the degree of swirl G in the direction opposite to the direction of flow plotted over the engine speed $n_M$ at the bottom. The engine speed $n_M$ is limited to an operating rotational speed $n_{Mo}$.

Given a swirl-free flow to the wheels of the compressor according to the dashed lines, the maximum engine braking power $P_B$ has to be limited by opening the variable vane structure 2.1 of the exhaust gas turbine 2, starting from a rotational speed limit $n_{ATL,\ max}$ of the exhaust gas turbocharger, in order to avoid exceeding the rotational speed limit of the exhaust gas turbocharger $n_{ATL,\ max}$. When the aerodynamic loading of the compressor wheel 3.1 increases, the engine braking power $P_B$ can be significantly increased by means of a swirl G in the direction opposite to the direction of flow according to the unbroken lines, without the rotational speed limit of the exhaust gas turbocharger $n_{ATL,\ max}$ being exceeded. Here, the peak pressure limitation in the engine cylinders starting from a specific charging pressure constitutes the decisive limitation.

What is claimed is:

1. A method for controlling the rotational speed of a variable exhaust gas turbocharger (1) of a controllable internal combustion engine (10) with a compressor (3) which has radial input end and output areas wherein an adjustable radial inflow guide vane structure (4) is disposed in a constant-width radial flow duct upstream of the compressor wheel (3.1) in the direction of flow so that the vane structure as adjustable over a range of −90° to +90°, wherein
   a) during a switching phase, a controllable swirl in the opposite direction from the direction of flow is generated against the compressor wheel (3.1), as a result of which the exhaust gas turbocharger (1) is braked and/or
   b) during an engine braking phase, the position of the variable vane structure (4) with swirl in the direction opposite to the direction of flow is formed in the inflow duct (3.3), as a result of which the rotational speed of the exhaust gas turbocharger (1) is limited in a controllable fashion and
   c) during a steady-state phase, a controllable swirl in the same direction as the flow with pressure reduction over the entire compressor is generated against the compressor wheel (3.1), as a result of which the compressor (3) operates as a turbine.

2. The method as claimed in claim 1, wherein by means of the adjustable radial inflow guide vane structure (4) and the variable radial diffuser vane structure (5) connected downstream of the compressor wheel (3.1) in the direction of flow, and the variable turbine guide vane structure (2.1), the rotational speed of the exhaust gas turbocharger (1) is controlled as a function of one of a charging pressure, a load and an engine speed of the internal combustion engine (10).

3. A variable exhaust gas turbocharger (1) for an internal combustion engine (10) having an exhaust gas turbine (2) and a compressor (3) with an adjustable inlet vane structure (4), the exhaust gas turbocharger (1) having a housing (1.1), a compressor wheel (3.1) with compressor wheel blades (3.2) connected to an exhaust gas turbine wheel via a shaft (1.2) for rotation therewith, said compressor having an inlet air duct (3.3) extending from an axial region to a radial region formed by a radial annular duct (3.3b)$_T$ upstream of the compressor wheel blades (3.2) in the direction of flow, said radial annular duct (3.3b) upstream of the compressor wheel (3.1) having an inlet area of constant axial width and, adjacent the inlet area, a compressor wheel area, wherein the axial width of the radial annular duct (3.3b) decreases in radial outward direction, said adjustable inlet vane structure (4) being disposed in the inlet area of constant axial width and comprising guide vanes of constant axial width and axially constant cross-section according to the inlet area of the radial annular duct (3.3b), whereas the axial width of the compressor wheel blades decreases in the radial outward direction in accordance with the annular duct area of decreasing axial width.

4. The exhaust gas turbocharger as claimed in claim 1, wherein a variable radial diffuser vane structure (5) with variable diffuser vanes (5.1) is provided within the radial annular duct (3.3b) of constant axial width downstream of the compressor wheel blades (3.2).

5. The exhaust gas turbocharger as claimed in claim 1, wherein the inflow guide vanes (4.1) of the radial inflow guide vane structure (4) are adjustable in a range of −90° to +90° to a setting with swirl in the same direction as the flow, a setting with swirl in the direction opposite to the direction of flow or an open setting, and the inflow guide vanes (4.1) reduce, in at least one of these settings (4.2), any desired mass flow rate flowing into the inlet duct (3.3) of the compressor (3) to the value of the engine idling point.

6. The exhaust gas turbocharger as claimed in claim 1, wherein all the compressor wheel blades (3.2) are joined by at least one common cover ring extending over the entire circumference (3.4) of the compressor wheel at the outer circumference of said compressor wheel blades (3.2) in the axial direction of the compressor wheel (3.1), said cover ring being sealed with respect to the housing (1.1) by means of a sealing structure.

7. The exhaust gas turbocharger as claimed in claim 1, wherein the variable exhaust gas turbocharger (1) is connected to a closed-loop and open-loop control system (20) of an internal combustion engine (10), the closed-loop and open-loop control system (20) having a closed-loop and open-loop control unit (30) which receives actual value signals (35) from the internal combustion engine (10) and from a plurality of pressure sensors in the closed-loop and open-loop control system (20) and the closed-loop and open-loop control unit (30) transmitting control signals (31, 32, 33, 34) to control devices for the turbine guide vane structure (2.1), of an exhaust gas recirculation valve (11), of the radial diffuser vane structure (5) or of the radial inflow guide vane structure (4) of the compressor (3).

* * * * *